(12) United States Patent
Molnar et al.

(10) Patent No.: US 8,200,286 B2
(45) Date of Patent: Jun. 12, 2012

(54) BASE STATION AND METHOD FOR IMPROVING COVERAGE IN A WIRELESS COMMUNICATION SYSTEM USING ANTENNA BEAM-JITTER AND CQI CORRECTION

(75) Inventors: Karl Molnar, Cary, NC (US); Bo Hagerman, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 778 days.

(21) Appl. No.: 12/262,724

(22) Filed: Oct. 31, 2008

(65) Prior Publication Data

US 2010/0112952 A1 May 6, 2010

(51) Int. Cl.
*H04M 1/00* (2006.01)
(52) U.S. Cl. ............... 455/562.1; 455/63.1; 455/63.4
(58) Field of Classification Search ........... 455/63.1, 455/63.4, 67.11, 69, 562.1
See application file for complete search history.

(56) References Cited

U.S. PATENT DOCUMENTS

| | | | | |
|---|---|---|---|---|
| 7,697,622 | B2 * | 4/2010 | Han et al. | 375/260 |
| 2005/0136840 | A1 | 6/2005 | Molnar | |
| 2005/0197071 | A1 * | 9/2005 | Yoshida et al. | 455/69 |
| 2006/0153283 | A1 * | 7/2006 | Scharf et al. | 375/148 |
| 2008/0051150 | A1 * | 2/2008 | Tsutsui | 455/562.1 |
| 2008/0165875 | A1 | 7/2008 | Mundarath et al. | |
| 2008/0205533 | A1 * | 8/2008 | Lee et al. | 375/260 |
| 2009/0291702 | A1 * | 11/2009 | Imai et al. | 455/517 |

OTHER PUBLICATIONS

Zekavat, Seyed et al. Transmit Diversity via Oscillating-Beam-Pattern Adaptive Antennas: An Evaluation Using Geometric-Based Stochastic Circular-Scenario Channel Modeling. IEEE Transactions on Wireless Communications, vol. 3 No. 4 Jul. 2004. XP011115055.
L. Kransy and K. Zangi, "Maximizing data rate over M-input/1-output channels," IEEE 55th Vehicular Technology Conference, vol. 2, pp. 938-942, May 2002.
Vishwanath, P., Tse, D.N.C., Laroia, R. "Opportunistic beamforming using dumb antennas," IEEE Transactions on Information Theory, 48(6):1277-94, Jun. 2002.

* cited by examiner

*Primary Examiner* — Joseph Chang
*Assistant Examiner* — Jeffrey Shin

(57) ABSTRACT

A base station and method are described herein that improves the coverage in a fixed-beam wireless communication system by using antenna beam-jitter and Channel Quality Information (CQI) correction. In one embodiment, the method includes the steps of: (a) modifying a beam by introducing a beam-jitter in a beam-forming pattern; (b) receiving an estimated channel quality information, CQI, from a user terminal; (c) accounting for effects of the beam-jitter on the estimated CQI to obtain a jitter-adjusted CQI estimate; (d) and using the jitter-adjusted CQI estimate during user scheduling for a future transmission to the user terminal.

24 Claims, 3 Drawing Sheets

BASE STATION AND METHOD FOR IMPROVING COVERAGE IN A WIRELESS COMMUNICATION SYSTEM USING ANTENNA BEAM-JITTER AND CQI CORRECTION

TECHNICAL FIELD

The present invention relates in general to the wireless communications field and, in particular, to a base station and method for improving the coverage in a fixed-beam wireless communication system using antenna beam-jitter and Channel Quality Information (CQI) correction.

BACKGROUND

The following abbreviations are herewith defined, at least some of which are referred to within the following description of the state-of-the-art and the present invention.
BLER Block Error Rate
CPICH Common Pilot Channel
CQI Channel Quality Information
CRC Cyclic Redundancy Check
GSM Global System for Mobile Communications
HS-DSCH High-Speed Downlink Shared Channel
HSDPA High-Speed Downlink Packet Access
IS Interim Standard
LTE Long Term Evolution
MCS Modulation and Coding Scheme
MI Mutual Information
SINR Signal to Interference Plus Noise Ratio
SNR Signal to Noise Ratio
TDRF Transmit Diversity with Rich Feedback
WCDMA Wideband Code Division Multiple Access In the wireless communications field, there are a number of advanced antenna techniques/configurations that can be considered for current and future base station deployments, ranging from calibrated diversity antennas that can be used for coherent combining, to antennas that can be co-phased for adaptive directional steering, to fixed beam configurations with either analog or digital beam-forming. One aspect present in current base stations is their ability to improve coverage for mobiles by using channel quality feedback from the mobiles when performing link adaptation and scheduling of the mobiles. While the type of channel quality feedback may be different for different antenna configurations, each antenna configuration must be complementary to the use of the channel quality feedback to improve coverage. However, each type of antenna configuration has disadvantages that need to be minimized without causing mismatches for either the link adaptation process or user scheduling.

For instance, base stations that deploy calibrated diversity antennas may have channel state information fed back from the mobile so the base station can calculate transmission weights for each transmit antenna such that the subsequent transmission is matched to the channel. This scenario is denoted as closed-loop transmit diversity or transmit diversity with rich feedback (TDRF), and is designed for use with transmit antennas that do not exhibit high correlation between elements (e.g. antennas with large spatial separation or different polarizations). Consider, for example, an approach similar to the above but for the high-speed downlink packet-data access (HSDPA) mode of a WCDMA communication system. One problematical issue when using this particular approach is described next which occurs when there are many mobiles in the WCDMA communication system. The base station sets transmit weights according to a scheduled (i.e. desired) mobile's channel state information (e.g. an estimate of the channel) that was fed back to the base station. During the data transmission to the scheduled user, the unscheduled mobiles in turn compute their channel state feedback (e.g. an estimate of the channel) after the uplink feedback transmission. However, a difficulty that arises is the SINR which is measured by the unscheduled mobiles on the common pilot channel (CPICH) may be different than the SINR achieved on the high-speed downlink shared channel (HS-DSCH). This difficulty arises because the transmit weights may be different for each channel, causing a different interference footprint to be present, affecting the SINRs. As a result, there is a mismatch between the achievable and measured SINRs on the CPICH and HS-DSCH channels. Consequently, the base station would need to account for this when selecting the modulation and coding schemes (MCSs) for the unscheduled mobiles. This topic is described in co-assigned U.S. Patent Application Publication No. US 2005/0136840 A1 entitled "SIR Estimates for Non-Scheduled Mobile Terminals" published on Jun. 23, 2005 (the contents of which are hereby incorporated herein by reference).

Alternatively, base stations that deploy co-phased antennas with closely spaced array elements can be used to adaptively steer energy towards a desired mobile and to place nulls in other directions. This is similar to the above approach, only now the co-phasing of the array establishes the directionality of the incoming and outgoing signals. This traditional beam-forming approach can obtain direction information from the uplink for creating the steering weights for the downlink transmission. While channel state information need not be fed back from the mobile, some measure of the channel quality must be sent, such as SINR or MCS information. This is commonly called the channel quality information (CQI) and since it is based on the SINR it may be subject to similar mismatches as was described above due to the adaptive nature of the beam-forming. The aforementioned U.S. Patent Application Publication No. US 2005/0136840 A1 also applies to this topic as well since the main problem is one of the CQI changing unexpectedly.

In another alternative, base stations that deploy fixed beam antenna configurations may have a number of beams placed within a cell or sector with fixed steering directions. One of these beams is selected for transmission to a particular mobile based on some criterion that is measured by either the mobile or the base station. For instance, the mobile may measure the signal strength transmitted along pilot channels in each beam, and select the strongest beam which the base station should use for subsequent transmission. Alternatively, measurements made during uplink transmissions, such as the signal strength in the best uplink beam, or the direction of the mobile can be used to select a downlink beam for transmission. While simpler from an antenna system perspective, there are still a number of issues concerning fixed beams that relate to CQI reporting which are similar to those discussed above with respect to calibrated diversity antennas and the co-phased antennas. Plus, there are a number of issues concerning fixed beams that relate to coverage which exist with respect to the fixed nature of the beam pattern. These issues are described in more detail next with respect to FIGS. 1 and 2 (PRIOR ART).

Referring to FIG. 1 (PRIOR ART), there is a block diagram illustrating the basic components of a fixed-beam wireless communication system 100 with mobiles 102 (only three shown) and a traditional base station 104 which includes a fixed beam antenna network 106, a scheduler unit 108, and a user data queue 110 (note: one having ordinary skill in the art will readily appreciate that descriptions of well-known components have been omitted so as not to obscure the current discussion). Basically, the scheduler unit 108 receives user information 112 (from the user data queue 110 which itself receives user data 114) and CQI 116 (from the mobiles 102) and then processes this information 112 and 116 to choose a specific mobile 102a (for example) to transmit user data 114 and from which fixed beam to transmit the user data 114 to the specific mobile 102a. In particular, the scheduler unit 108 processes information 112 and 116 to choose the specific mobile 102a (user selection 118) and then determine the transmission rate 120 and a beam selection 122 which are used to transmit the user data 114 to the mobile 102a. As shown, the scheduler unit 108 forwards the user selection 118 and the transmission rate 120 to the user data queue 110 and forwards the beam selection 122 to the fixed beam antenna network 106. The fixed beam antenna network 106 creates the fixed beams using analog and/or digital beam-forming.

Referring to FIG. 2 (PRIOR ART), there is a plot showing an example of a fixed beam pattern emitted from the traditional base station 104 where the beam pattern has four orthogonal beams 200a, 200b, 200c and 200d spanning over 180 degrees, although the coverage area might actually include a subset of the 180 degrees (e.g. the center 120 degrees). The beam gain for this particular fixed-beam pattern is plotted for each of the four beams vs. the direction. The following characteristics can be observed from this ideal fixed beam pattern:

- There is a loss of roughly two dB at the cross-over points between the two center beams.
- The beams have an unequal main-beam width as a function of angular beam (i.e. mobile) direction.
- The high side-lobe levels of one beam can cause interference to mobiles in other beams, and this is most pronounced at the beam cross-over points.
- The element pattern is multiplicative with the array pattern and causes a loss in beam-forming gain as a function of angular beam direction.

In the past, these issues have been addressed in different manners. For instance, more narrow beams can be added to reduce the cross-over loss and the beam-shape can be changed as a function of direction. Plus, non-orthogonal (i.e. tapered) beams can be added to improve coverage at the cross-over points and to improve the side-lobe levels. However, the approach results in a loss in peak gain. Another approach is to vary the beam-shape for a particular beam over time so that it has the same average gain for any mobile direction. This approach is considered and discussed in co-assigned Swedish Patent Application No. 010381703 filed Nov. 16, 2001 (the contents of which are hereby incorporated herein by reference).

However, the proposed solutions to these issues do not address the aforementioned CQI measurement problems when beam selection is used for improving downlink coverage. In particular, the problems associated with measuring CQI can cause beams to be pointed to a desired (i.e. scheduled) mobile but potentially causes interference to unscheduled mobiles. This is because unscheduled mobiles may be located within the main-beam direction or in the side-lobe direction, and the interference will be different in each case. Additionally, when CQI is based on SINR levels, then the CQI will also vary depending on the mobiles' locations with respect to the fixed beam centers. Thus, the goal of obtaining uniform coverage should also consider obtaining more accurate/predictable CQI values when addressing the aforementioned issues associated with the fixed beam antenna configuration. These problems and other problems are satisfied by the present invention.

SUMMARY

In one aspect, the present invention provides a method for improving coverage in a fixed beam-forming wireless communications network. The method includes the steps of: (a) modifying a beam by introducing a beam-jitter in a beam-forming pattern; (b) receiving an estimated channel quality information, CQI, from a user terminal; (c) accounting for effects of the beam-jitter on the estimated CQI to obtain a jitter-adjusted CQI estimate; (d) and using the jitter-adjusted CQI estimate during user scheduling for a future transmission to the user terminal. The method is desirable since it improves the coverage and also helps bring a better stability to the fixed beam-forming wireless communications network.

In another aspect, the present invention provides a base station which includes a user data queue, a beam-forming antenna network, a scheduler unit, and a jitter control unit. The scheduler unit receives user information from the user data queue, estimated channel quality information, CQIs, from user terminals, and beam jitter information from the jitter control unit and then processes all of this information to account for effects of the beam-jitter on the estimated CQIs and obtain jitter-adjusted CQI estimates which are used to choose a user terminal to transmit user data and select which beam in the beam-forming antenna network to transmit the user data to the chosen user terminal. The beam-forming antenna network receives beam selection information from the scheduler unit, receives the beam jitter information from the jitter control unit and then modifies the selected beam by introducing a beam-jitter in a beam-forming pattern. The base station improves the coverage and also helps bring a better stability to the fixed beam-forming wireless communications network.

In yet another aspect, the present invention provides a user terminal including a processor and a memory that stores processor-executable instructions where the processor interfaces with the memory and executes the processor-executable instructions to enable the following: (a) receive a signal transmitted from a base station that modified a beam by introducing a beam-jitter in a beam-forming pattern prior to transmitting the signal; (b) estimate a channel quality information, CQI, associated with the received signal; (c) account for effects of the beam-jitter on the estimated CQI to obtain a jitter-adjusted CQI estimates, where the account operation includes estimating an amount a signal to interference plus noise ratio, SINR, changes in the estimated CQI that is due to the beam-jitter; and (d) transmit the estimated CQI and the jitter-adjusted CQI estimate. The user terminal helps improve the coverage and also helps bring a better stability to a fixed beam-forming wireless communications network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The present invention relates to a base station and a method for improving coverage in a fixed beam-forming wireless communication system by providing an equal beam-forming gain over direction on average by pre-deterministically applying a jitter to the beam-forming pattern for a beam or a set of beams periodically over time. In particular, the base station and method obtain equal coverage by using a beam jitter with a fixed-beam antenna configuration so that a particular coverage area obtains equal beam-forming gain over some desired timeframe. The beam jitter (i.e. beam variation) is confined to the relative direction of an original fixed beam pattern so it is still considered a fixed beam-forming system (this particular feature addresses the aforementioned link adaptation problem). With each beam confined to the same relative direction as the original fixed beam direction, the user terminals (e.g., mobiles, fixed-location terminals) can compute the SINR at one time and then send the CQI reports back to the base station. The CQI report can be made up on one or more of the following items:

Signal to interference and noise ratio (SINR);
Signal to noise ratio (SNR);
Mutual information (MI);
A function of the SINR or SNR values;
A quantity representative of the post receiver quality such as block error rate (BLER) or the cyclic redundancy check (CRC).

The base station can then account for the predetermined beam-jitter and adjust the CQI report so that MCS values are appropriately selected for future transmission times of user data to the user terminals (this particular feature addresses the aforementioned user selection problem). A detailed discussion about the base station and method of the present invention is provided next with respect to FIGS. 3-6.

Figure 3:
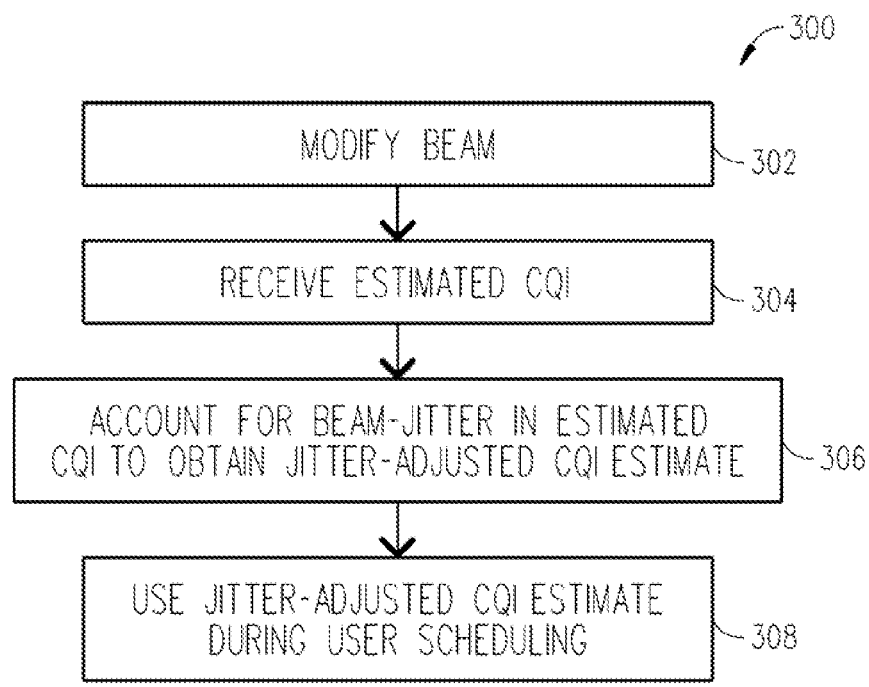
FIG. 3 is a flowchart illustrating the basic steps of a method for improving the coverage in a fixed beam-forming wireless communication system using antenna beam-jitter and CQI correction in accordance with an embodiment of the present invention.

Referring to FIG. 3, there is a flowchart illustrating the basic steps of a method 300 for improving the coverage in a fixed beam-forming wireless communication system using antenna beam-jitter and CQI correction in accordance with an embodiment of the present invention. This method 300 can be implemented by a base station that employs digital beam forming or analog beam forming for systems based on for example IS-136, GSM and WCDMA standards. In one embodiment, the method 300 includes the following steps:

Step 302: Modifying the beam by introducing a jitter in the beam-forming pattern so that:

The beam points in the same relative direction as one of the beams in a nominal fixed beam-forming configuration; and Over a fixed time period the jitter is varied so that the coverage gain is approximately the same for any user terminal which is placed within a nominal fixed beam from the original fixed beam-forming configuration.

Steps 304 and 306: Receiving an estimated CQI from a user terminal and then accounting for the effects of the beam-jitter on the estimated CQI to obtain a jitter-adjusted CQI estimate.

Step 308: Using the jitter-adjusted CQI estimate during user scheduling to account for the beam-jitter.

Note: A pre-determined schedule for the jitter variation of the beam can be used so that once the jitter is known at one time instant it can be determined for future time instants.

This particular jitter pattern may also be periodic over some time interval. Furthermore, the jitter patterns may be different for different cells. As an example, consider two different cells. The periodicity of the patterns in the two cells may be different. Alternatively, the jitter pattern in each cell may be different. Additionally, combinations of different periodicities and patterns may be used in the two different cells.

Figure 4:
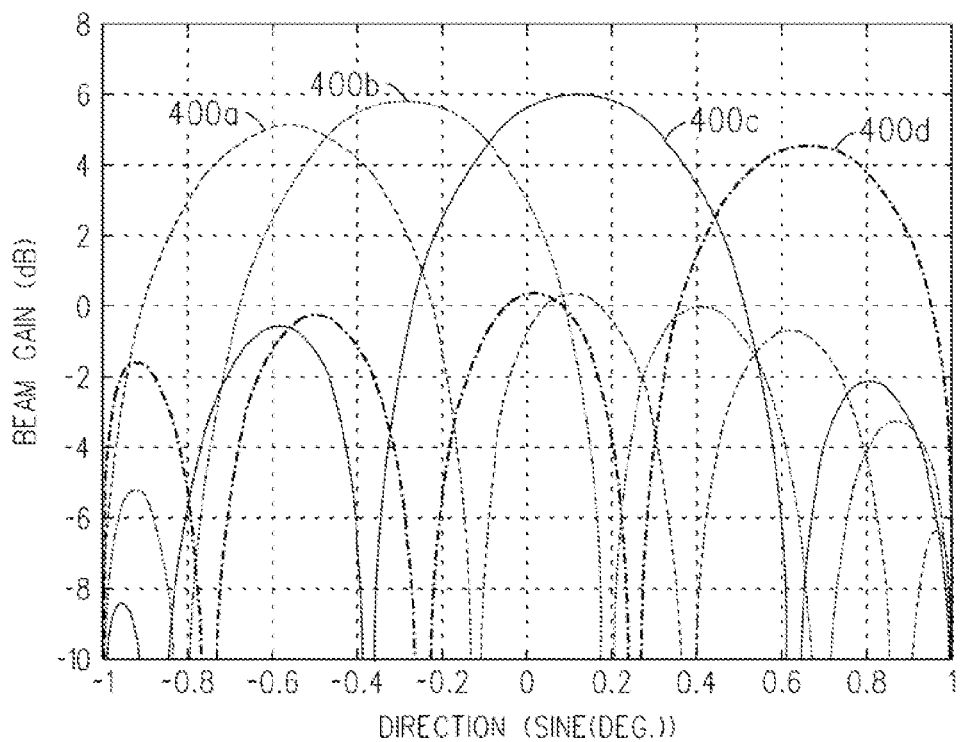
FIG. 4 is a plot of a beam pattern that has been modified by the beam-jitter method which is shown in FIG. 3 in accordance with an embodiment of the present invention.

An example of method 300 is described next. Consider the four fixed-beam configuration shown in FIG. 2 (PRIOR ART), except now the pointing directions of each beam 200a, 200b, 200c and 200d change when implementing the method 300 in accordance with an embodiment of the present invention. First, let $\phi$ be the azimuth angle. Then the nominal pointing directions of the four beams 200a, 200b, 200c and 200d shown in FIG. 2 (PRIOR ART) respectively take values of $\sin(\phi)=[-0.75, -0.25, 0.25, 0.75]$. Starting with $\sin(\phi_i)$ as the nominal pointing direction of beam i in sine space, a sequence of pointing directions is created. For this beam, let these new directions be denoted as $\gamma_{i,l}$, where $l=\{1, 2, \ldots, L\}$ is an index of time, and the values of $\gamma_{i,l}$ are given by $\sin(\gamma_{i,l}) = \sin(\phi_i)+n_{i,l}/16$, where $n_{i,l} \in \{0,\pm1,\pm2\}$. Thus, the sequence $\{n_{i,1}, n_{i,2}, \ldots, n_{i,L}\}$ defines the jitter in time as the change in direction about the nominal pointing angle for beam i. Note, a beam jitter pattern can be defined for each beam separately, and may be periodic. By limiting the values $n_{i,l}$ to be small, the jittered beam points roughly in the same direction as the nominal beam direction. An exemplary result of this beam jitter approach is shown in FIG. 4. In this figure, a snapshot of the beam patterns 400a, 400b, 400c and 400d is shown at time l, with the jitter values for all of the jittered beams being equal to $[n_{1,l}, n_{2,l}, n_{3,l}, n_{4,l}]=[2, -1, -2, 0]$. An exemplary base station 500 that can implement this approach is described next with respect to FIG. 5.

Figure 5:
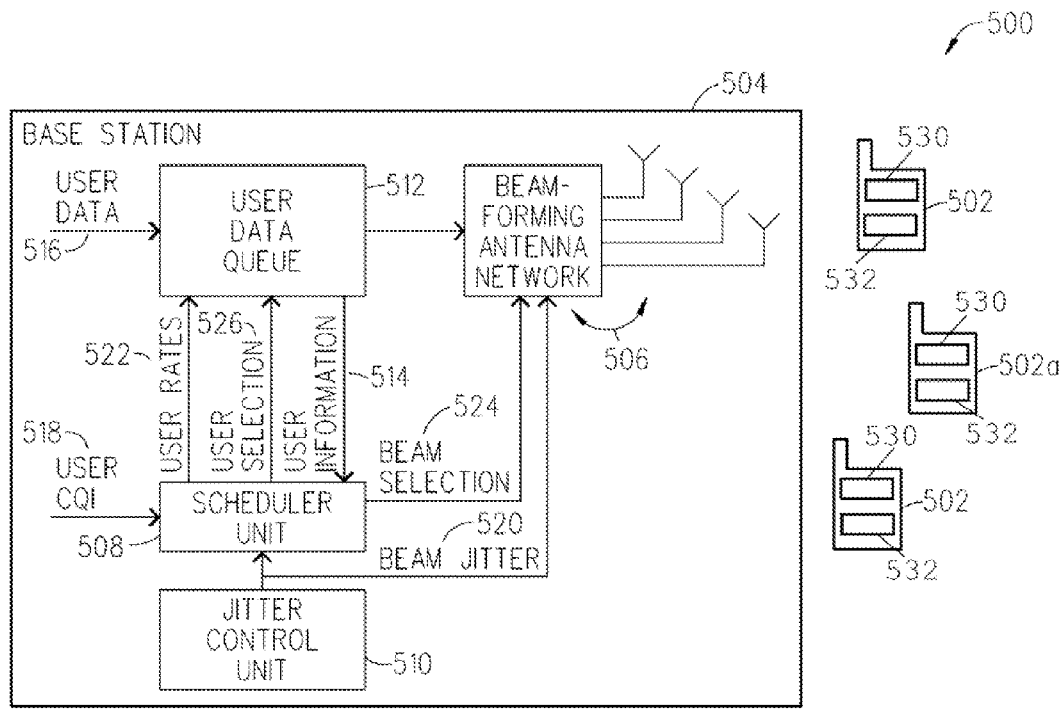
FIG. 5 is a block diagram of a wireless communication system including a base station that has been configured in accordance with an embodiment of the present invention.

Referring to FIG. 5, there is a block diagram illustrating the basic components of a fixed-beam wireless communication system 500 which includes user terminals 502 (only three shown) and a base station 504 that is configured in accordance with an embodiment of the present invention. As shown, the base station 504 includes a beam-forming antenna network 506, a scheduler unit 508, a jitter control unit 510, and a user data queue 512 (note: one having ordinary skill in the art will readily appreciate that descriptions of well-known components have been omitted so as not to obscure the discussion about the present invention). Basically, the scheduler unit 508 receives user information 514 (from the user data queue 512 which itself receives user data 516), CQI 518 (from the user terminals 502), and beam jitter information 520 (from the jitter control unit 510) and then processes this information 514, 518 and 520 to choose a user terminal 502a (for example) to transmit user data 516 and from which beam to transmit the user data 516 to the chosen user terminal 502a. In particular, the scheduler unit 508 processes information 514, 518 and 520 to account for effects of the beam-jitter on the estimated CQIs and obtain a jitter-adjusted CQI estimates which are used to determine the transmission rate 522 and determine a beam selection 524 to enable user data 514 to be transmitted to the chosen user terminal 502a. As shown, the scheduler unit 508 upon selecting user terminal 502a forwards a user selection 526 (indicating user terminal 502a) and the transmission rate 522 to the user data queue 512 and forwards the beam selection 524 to the beam-forming antenna network 506. In addition, the jitter control unit 510 forwards the beam jitter information 520 to the beam-forming antenna network 506. In this case, the beam-forming is now adaptive, in the sense that the jitter modifies the beam-patterns. In one embodiment, the beam jitter information 520 may for example include weight modifications which are applied to an adaptive beam-forming matrix.

Each user terminal 502 typically estimates the CQI 518 and reports this back to the base station 504 so user scheduling can be performed. The estimated CQI reports 518 are commonly a function of the SINR, where noise may include thermal noise and possibly interference. In this embodiment, each user terminal 502 estimates and reports SINR values to the base station 504 and, in turn, the base station 504 estimates the jitter values and adjusts the SINR so the adjusted CQI can be used for future transmission times based on the future value of the jitter (see steps 304-308). An example of how this can be accomplished in accordance with an embodiment of the present invention is described next.

Let the SINR value estimated by a user terminal 502 be represented as $\rho_m$, where m is again a time index. The estimated SINR is $\rho_m = \sigma_m + \alpha_m$ and is comprised of an SINR based on the nominal beam pointing angle, $\sigma_m$, and the SINR difference, $\alpha_m$, due to the jitter value (recall the estimated SINR in this example is the same as the estimated CQI 518). Next, the base station 504 accounts for the beam jitter in the user scheduling process. For instance, the base station 504 when scheduling user terminals 502 can use the estimated SINR to determine a modulation and coding scheme (MCS) which can be used for transmission to the user terminal 502 at some time m+k. Thus, $\rho_{m+k}$ should be determined in order to choose an appropriate MCS at this time. Two cases arise for determining $\rho_{m+k}$. The first is when the nominal SINR $\sigma_m \cong \sigma_{m+k}$, and the second case is when $|\sigma_m - \sigma_{m+k}| > \max(\alpha_m, \alpha_{m+k})$. The first case implies that the SINR change is primarily due to the beam jitter. For example, this case may arise from slowly fading propagation conditions. The second case implies that the SINR variations are larger than the SINR difference due to beam jitter. For example, this case may arise due to faster vehicle speeds. When the SINR difference due to the beam jitter can be determined in the first case, then the base station 504 can select the MCS values based on an adjusted SINR estimate (in decibels) as $\rho_{m+k} = \rho_m - \alpha_m + \alpha_{m+k}$. Alternatively in the second case, when the SINR variations overshadow the SINR difference due to the beam jitter, then the base station 504 can select MCS values based on the current estimated SINR (i.e. $\rho_{m+k} = \rho_m$).

In one embodiment, the base station 504 can implement step 306 and calculate the jitter adjusted SINR (jitter adjusted CQI) by determining the SINR differences due to beam jitter by using the following approach. First, assume that the beam jitter pattern is periodic for the beam under consideration, with a period L. Additionally, assume that CQI reports 518 are made during each uplink transmission. From the set of reported CQI 518 measurements, calculate L average SINR values $\{\bar{\rho}_1, \bar{\rho}_2, \ldots, \bar{\rho}_L\}$, where the averages are constructed from the SINRs that have the same beam jitter value. For instance, this could be accomplished using $\bar{\rho}_{mod(m-1,L)+1} = E\{\rho_m, \rho_{m-L}, \rho_{m-2L}, \ldots, \rho_{m-KL}\}$, where the $E\{\cdot\}$ term represents a sample average or some other filtering operation. The term mod(m−1,L)+1 takes values from 1 to L, indexing one of the beam jitter positions. The determination of each average utilizes only those SINRs that have the same beam jitter position. Using these L average SINR estimates, the SINR differences can be estimated by removing the common average $\bar{\rho} = E\{\bar{\rho}_1, \bar{\rho}_2, \ldots, \bar{\rho}_L\}$ from each $\bar{\rho}_l$ estimate. From these $\bar{\rho}_l - \bar{\rho}$ values the terms $\alpha_{m+k} - \alpha_m$ can be determined for computing the $\rho_{m+k}$ terms. In this example, the SINR values have been expressed in terms of dBs, allowing operations to be performed using additions and subtractions. Alternatively, SINRs could be expressed in linear representations, and then the operations performed in this case would be scaling operations.

In the above example, when the SINR difference terms $\alpha_{m+k} - \alpha_m$ can not be reliably estimated, then the base station 504 would select MCS values based on the current estimated SNR (i.e. $\rho_{m+k} = \rho_m$). A determination of when to disable the jitter adjustment can be made based on the statistics of the estimated SINR values, for example, the standard deviation. Thus, when the SINR variations are larger than the SINR differences due to beam jitter, then it can be seen that compensating for the jitter would not be productive. However, this is not an unfavorable outcome since the beam jitter pattern for downlink transmission would still create an equitable distribution of beam gain, and even without compensating for the beam jitter there should be no user terminal user that would persistently remain in an unfavorable beam direction, such as a beam crossover position.

The base station 504 may also consider the following in addition to the exemplary approach described above:

Information regarding the position or direction of user terminals 502 relative to the beam center may be available and can be used to assist in estimating the SINR difference values or in setting/adjusting the MCS values for particular user terminals 502 at some future transmission time.

Information regarding the position or direction of user terminals 502 relative to the beam center may be available and can be used in setting/adjusting the power levels to/from particular user terminals 502 at some future transmission time.

The base station 504 could use a fixed MCS value, but adjust the transmit power to the mobile based on the jitter-adjusted CQI estimate (SINR).

The base station 504 or scheduling unit 508 knowing the effect of the beam jitter on the user terminal 502 can consider this effect not just for a single transmission, but for scheduling multiple transmissions to the user terminal 502. For example, the base station 504 can schedule multiple data transmissions or possible retransmissions of negatively acknowledged data at advantageous beam positions towards a specific user terminal 502.

Figure 1:
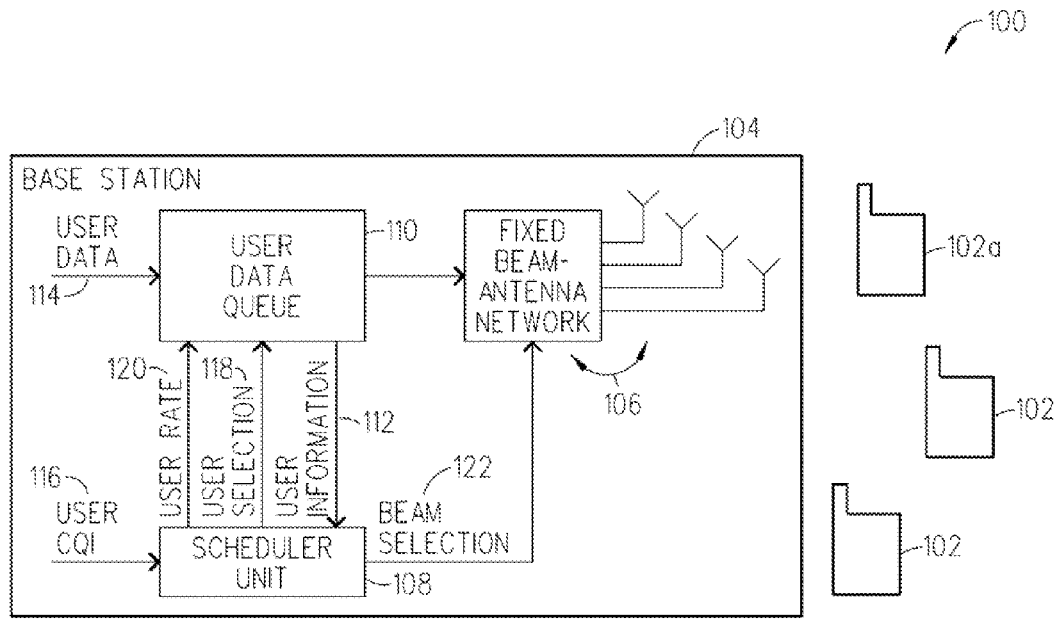
FIGS. 1 and 2 (PRIOR ART) respectively illustrate a block diagram of a wireless communication system incorporating a traditional base station and a plot of a fixed beam pattern which are used to help explain problems which are addressed by the present invention.
Figure 2:
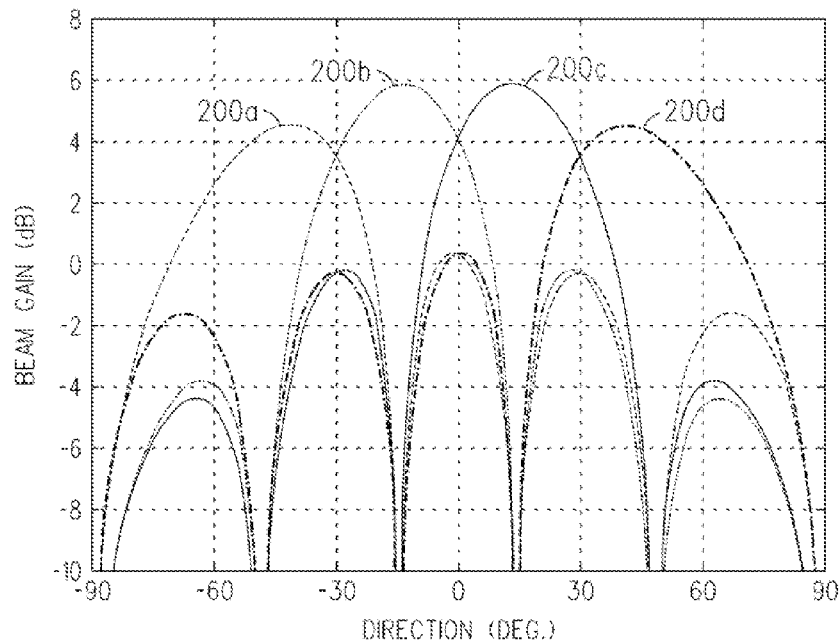
Figure 6:
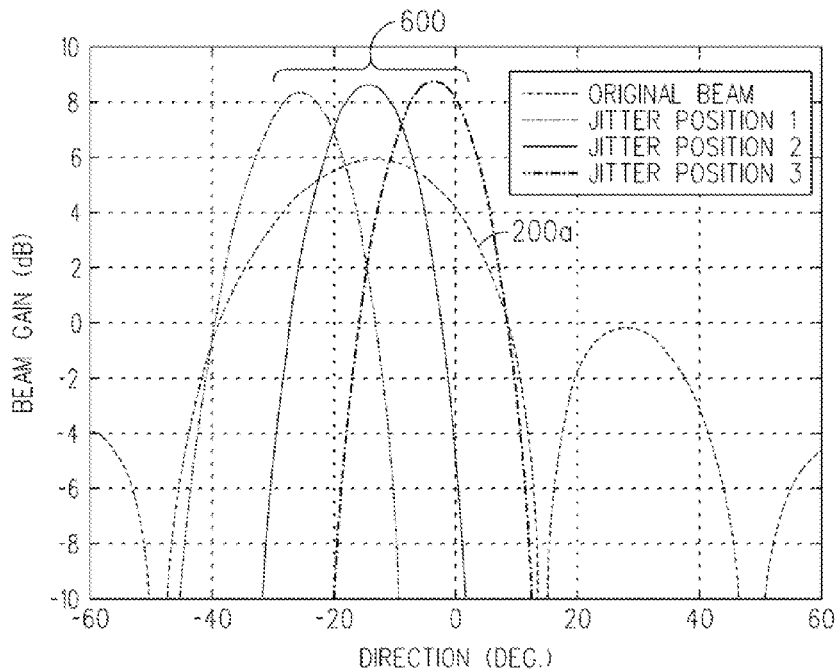
FIG. 6 is a plot of another beam pattern that has been modified by the beam-jitter method which is shown in FIG. 3 in accordance with another embodiment of the present invention.

In the embodiment described above, the base station 504 uses orthogonal beams for the beam pattern, resulting in roughly the same beam pattern in sine space when compared to the traditional fixed-beam pattern (compare FIGS. 2 and 4). Alternatively, in another embodiment, as the pattern of each beam is modified over time, it may be desirable for the base station 504 to alter the beam-shape so that the beams become wider, narrower, or take different pattern shapes to maintain equal directional gain over time. FIG. 6 is a plot which illustrates an example of this where a beam-jitter pattern has one beam 600 with three jitter positions that cover one of the original beams 200a (for example) shown in FIG. 4. The beam 600 with three different jitter positions is narrower and has a greater beam-forming gain and lower sidelobe levels when compared to the original beam 200a. However, the beam 600 with three different jitter positions covers essentially the same direction as the original beam 200a. The beam jitter positions are numbered in the plot so as to represent the directional shift for every three downlink transmissions.

In another embodiment, the user terminal 502 can perform the beam jitter SINR adjustment (step 306) rather than having this performed at the base station 504. Similar to the approach described above and performed at the base station 504, the user terminal 502 could operate in a blind fashion to determine the SINR offsets. In one case, the user terminal 502 would have a processor 530 and a memory 532 that stores processor-executable instructions where the processor 530 interfaces with the memory 532 and executes the processor-executable instructions to enable the following: (a) receive a signal transmitted from a base station 504 that modified a beam by introducing a beam-jitter in a beam-forming pattern before transmitting the signal; (b) estimate a channel quality information, CQI, associated with the received signal; (c) account for effects of the beam-jitter on the estimated CQI to obtain a jitter-adjusted estimated CQI, where the accounting operation includes estimating an amount a signal-to-noise ratio, SINR, changes within the estimated CQI which is due to the beam-jitter (see previous description); and (d) transmit the estimated CQI and the jitter-adjusted estimated CQI (note: the processor 530 and the memory 532 are implemented, at least partially, as some combination of software, firmware, hardware, or hard-coded logic). The user terminal 502 can also determine the period of the jitter pattern. Alternatively, information regarding the beam-jitter repetition schedule could be communicated either indirectly or directly from the base station 504 to the user terminal 502. An indirect approach could be to align the jitter schedule to some know signaling channel (e.g. a synchronization channel). Alternatively, jitter information could be signaled explicitly via one of the downlink signaling channels (e.g. a broadcast or shared control channel) commonly used between the base station 504 and the user terminal 502.

The present invention has several advantages some of which are as follows:

The base station 504 in allowing a fixed-beam to fluctuate slightly about a nominal direction effectively reduces the cross-over loss for specific directions over time. Plus, beam patterns can be designed for a specific coverage area. In addition, instead of designing one beam pattern that statically covers the area, a sequence of beam patterns can be designed for better coverage over both space and time.

The base station 504 can provide more uniform coverage which helps to bring better stability to the wireless communications network 500. This result occurs by providing an equal effective beam-forming gain over both direction and time using appropriately designed beam jitter patterns as described above. In addition, beam patterns with jitter can be designed to account for steering loss or unequal beam-widths.

The base station 504 can design a main-beam pattern to be more narrow where, for example, beam-shapes with higher cross-over losses can be now be tolerated. In addition, the base station 504 can achieve higher peak gains by using more narrow beams which may present lower interference to own-cell user terminals 502 and other-cell user terminals 502.

An improved level of robustness to estimation effects is obtained using this approach. For instance, CQI estimates are adjusted appropriately using this approach such that situations where mismatches could occur are now reduced. Additionally, the base station 504 can schedule user terminals 502 so they receive the most advantageous beam-forming gain which helps to improve the estimation of parameters used at the user terminals 502.

This approach is advantageous in cell-edge environments. For instance, the base station 504 when scheduling user terminals 502 can now take advantage of the beam positions to improve coverage at the cell edge. Additionally, the base station 504 has the opportunity to use beam patterns and jitter sequences specifically designed to help minimize cell-edge interference.

The base station 504 implementing this approach differs from a traditional base station that deploys what is known as opportunistic beam-forming. An exemplary traditional base station which deploys opportunistic beam-forming was described in the following article: Vishwanath, P. et al. "Opportunistic beamforming using dumb antennas," IEEE Transactions on Information Theory, 48(6):1277-94, June 2002. This traditional base station swept a beam across the coverage area and the user terminals where scheduled at the time when the beam is visible to a particular user terminal, and when the beam is not visible to the user terminal then the user terminal user did not receive transmissions. In contrast, the base station 504 of the present invention confines the beam to the same relative direction within a larger coverage area which ensures that the beam is visible to the user terminal; however, the jitter ensures a more equitable distribution of coverage.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as has been set forth and defined by the following claims.

The invention claimed is:

1. A method for improving coverage in a fixed beam-forming wireless communications network, said method comprising the steps of:

modifying a beam by introducing a beam-jitter in a beam-forming pattern;

receiving an estimated channel quality information, CQI, from a user terminal;

accounting for effects of the beam-jitter on the estimated CQI to obtain a jitter-adjusted CQI estimate;

using the jitter-adjusted CQI estimate during user scheduling for a future transmission to the user terminal; and wherein over a fixed time period the beam-jitter is varied so that a coverage gain is approximately the same for any user terminal placed within a beam in a nominal fixed beam-forming configuration.

2. The method of claim 1, further comprising a step of using a schedule for varying the beam-jitter of the beam in a pre-determined manner.

3. The method of claim 1, further comprising a step of using a schedule for varying the beam-jitter of the beam in a periodic manner over a time interval.

4. The method of claim 1, wherein the accounting step further includes estimating an amount a signal to interference plus noise ratio, SINR, changes in the estimated CQI that is due to the beam-jitter by using a direction of the user terminal relative to a center of the modified beam.

5. The method of claim 1, wherein the accounting step further includes estimating an amount a signal to interference plus noise ratio, SINR, changes in the estimated CQI that is due to the beam-jitter when the beam-jitter for the beam is periodic with a period L and when user terminals make CQI reports during each uplink transmission by:
creating L average signal to interference plus noise ratio, SINR, values using the CQI reports, where the averages are constructed from the SINRs that have the same beam-jitter; and
removing a common average from each of the L average SINR values to estimate the SINR changes.

6. The method of claim 1, wherein the using step further includes selecting a modulation and coding scheme, MCS, based on an adjusted estimated signal to interference plus noise ratio, SINR, when a difference between the estimated CQI and the jitter-adjusted CQI estimate is primarily due to the beam-jitter.

7. The method of claim 1, wherein the using step further includes selecting a modulation and coding scheme, MCS, based on an estimated signal to interference plus noise ratio, SINR, when a difference between the estimated CQI and the jitter-adjusted CQI estimate is primarily due to a SINR variation.

8. The method of claim 1, wherein the using step further includes using a fixed modulation and coding scheme, MCS, but adjusting a transmit power to the user terminal based on the jitter-adjusted CQI estimate.

9. The method of claim 1, wherein the using step further includes selecting a modulation and coding scheme, MCS, based on an estimated signal to interference plus noise ratio, SINR, when a difference between the estimated CQI and the jitter-adjusted CQI estimate can not be reliably estimated.

10. The method of claim 1, wherein the using step further includes using the jitter-adjusted CQI estimate to schedule multiple transmissions or retransmission to the user terminal.

11. The method of claim 1, wherein said modifying step further includes altering a shape of the beam so that the beam becomes wider, narrower, or takes a different pattern shape to maintain an equal directional gain over time.

12. The method of claim 1, wherein the modified beam points in a substantially same direction as a beam in a nominal fixed beam-forming configuration.

13. The method of claim 1, wherein the beam-jitter includes a weight modification that is applied to an adaptive beam forming matrix used to generate the beam-forming pattern.

14. A base station comprising:
a user data queue;
a beam-forming antenna network;
a scheduler unit;
a jitter control unit;
said scheduler unit receives user information from the user data queue, estimated channel quality information, CQIs, from user terminals, and beam jitter information from the jitter control unit and then processes all of this information to account for effects of the beam-jitter on the estimated CQIs and obtain jitter-adjusted CQI estimates which are used to choose a user terminal to transmit user data and select which beam in the beam-forming antenna network to transmit the user data to the chosen user terminal;
said beam-forming antenna network receives beam selection information from the scheduler unit, receives the beam jitter information from the jitter control unit and then modifies the selected beam by introducing a beam-jitter in a beam-forming pattern; and
wherein over a fixed time period the beam-jitter is varied so that a coverage gain is approximately the same for any user terminal placed within a beam in a nominal fixed beam-forming configuration.

15. The base station of claim 14, wherein said jitter control unit includes a schedule for varying the beam-jitter of the selected beam in a pre-determined manner.

16. The base station of claim 14, wherein said jitter control unit includes a schedule for varying the beam-jitter of the selected beam in a periodic manner over a time interval.

17. The base station of claim 14, wherein said jitter control unit varies beam-jitter of beams using at least one of different periods and different patterns in different cells.

18. The base station of claim 14, wherein the scheduler unit estimates an amount a signal to interference plus noise ratio, SINR, changes in each of the estimated CQIs where the changed SINR is due to the beam-jitter.

19. The base station of claim 14, wherein the scheduler unit selects a modulation and coding scheme, MCS, for the selected user terminal based on an adjusted estimated signal to interference plus noise ratio, SINR, when a difference between the corresponding estimated CQI and the corresponding jitter-adjusted CQI estimate is primarily due to the beam-jitter.

20. The base station of claim 14, wherein the scheduler unit selects a modulation and coding scheme, MCS, for the selected user terminal based on an estimated signal to interference plus noise ratio, SINR, when a difference between the corresponding estimated CQI and the corresponding jitter-adjusted CQI estimate is primarily due to a SINR variation.

21. The base station of claim 14, wherein the scheduler unit uses a fixed modulation and coding scheme, MCS, but adjusting a transmit power to the user terminal based on the jitter-adjusted CQI estimate.

22. A user terminal comprising:
a processor; and
a memory that stores processor-executable instructions where the processor interfaces with the memory and executes the processor-executable instructions to enable the following:
receive a signal transmitted from a base station that modified a beam by introducing a beam-jitter in a beam-forming pattern prior to transmitting the signal;
estimate a channel quality information, CQI, associated with the received signal;
account for effects of the beam-jitter on the estimated CQI to obtain a jitter-adjusted estimated CQI, where the account operation includes estimating an amount a signal to interference plus noise ratio, SINR, changes in the estimated CQI that is due to the beam-jitter;
transmit the estimated CQI and the jitter-adjusted estimated CQI; and
wherein over a fixed time period the beam-jitter is varied so that a coverage gain is approximately the same for any user terminal placed within a beam in a nominal fixed beam-forming configuration.

23. The user terminal of claim 22, wherein the processor further enables a determination of a period of the beam-jitter that is associated with the received signal.

24. The user terminal of claim 22, wherein the processor further enables receipt of information regarding a repetition schedule of the beam-jitter from the base station.

* * * * *

UNITED STATES PATENT AND TRADEMARK OFFICE
CERTIFICATE OF CORRECTION

PATENT NO.         : 8,200,286 B2                                   Page 1 of 1
APPLICATION NO.    : 12/262724
DATED              : June 12, 2012
INVENTOR(S)        : Molnar et al.

It is certified that error appears in the above-identified patent and that said Letters Patent is hereby corrected as shown below:

In Column 8, Line 21, delete "SNR" and insert -- SINR --, therefor.

Signed and Sealed this
Twenty-third Day of October, 2012

David J. Kappos
*Director of the United States Patent and Trademark Office*